US011544705B2

(12) United States Patent
Naccache et al.

(10) Patent No.: US 11,544,705 B2
(45) Date of Patent: Jan. 3, 2023

(54) METHOD FOR THE ENCRYPTION OF PAYMENT MEANS DATA, CORRESPONDING PAYMENT MEANS, SERVER AND PROGRAMS

(71) Applicant: Banks and Acquirers International Holding, Paris (FR)

(72) Inventors: David Naccache, Paris (FR); Remi Geraud, Antony (FR); Hiba Koudoussi, Paris (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 351 days.

(21) Appl. No.: 15/347,982

(22) Filed: Nov. 10, 2016

(65) Prior Publication Data
US 2017/0132622 A1 May 11, 2017

(30) Foreign Application Priority Data

Nov. 10, 2015 (FR) ..................................... 1560772

(51) Int. Cl.
*G06Q 20/38* (2012.01)
*G06Q 20/40* (2012.01)
*G06Q 20/34* (2012.01)

(52) U.S. Cl.
CPC ......... *G06Q 20/3829* (2013.01); *G06Q 20/34* (2013.01); *G06Q 20/3563* (2013.01);
(Continued)

(58) Field of Classification Search
CPC ............... G06Q 20/3829; G06Q 20/34; G06Q 20/3563; G06Q 20/382; G06Q 20/3821;
(Continued)

(56) References Cited

U.S. PATENT DOCUMENTS 8,978,152 B1 * 3/2015 Rozenberg .......... H04L 63/0428
726/26
2007/0136211 A1 6/2007 Brown et al.
(Continued)

FOREIGN PATENT DOCUMENTS

EP 2787474 A2 10/2014

OTHER PUBLICATIONS

"Mihir Bellare et al., The Exact Security of Digital Signatures—How to Sign with RSA and Rabin, Mar. 14, 1996, Advances in Cryptology—Eurocrypt 96 Proceedings, Lecture Notes in Computer Science vol. 1070, U. Maurer ed., Springer-Verlag, 1996" (Year: 1996).*
(Continued)

*Primary Examiner* — Neha Patel
*Assistant Examiner* — Courtney P Jones
(74) *Attorney, Agent, or Firm* — David D. Brush; Westman, Champlin & Koehler, P.A.

(57) ABSTRACT

A method for encrypting a piece of payment means data is disclosed. This method is implemented by a payment means having a data processor. Such a method has at least one iteration of the following steps: obtaining a current piece of payment means data from a memory of the payment means; generating a following piece of payment means data as a function of the current piece of payment means data and as a function of an encryption key of the payment means; replacing the current piece of payment means data by the following piece of payment means data within the memory of the payment means.

8 Claims, 3 Drawing Sheets

(52) U.S. Cl.
CPC ....... *G06Q 20/382* (2013.01); *G06Q 20/3821* (2013.01); *G06Q 20/3823* (2013.01); *G06Q 20/38215* (2013.01); *G06Q 20/4018* (2013.01); *G06Q 2220/00* (2013.01)

(58) Field of Classification Search
CPC ......... G06Q 20/38215; G06Q 20/3823; G06Q 20/4018; G06Q 2220/00
See application file for complete search history.

(56) References Cited

U.S. PATENT DOCUMENTS

| | | | |
|---|---|---|---|
| 2008/0110983 A1 | 5/2008 | Ashfield | |
| 2008/0120236 A1* | 5/2008 | Faith | G06Q 20/20 705/44 |
| 2009/0006262 A1* | 1/2009 | Brown | G06Q 20/4016 705/64 |
| 2009/0150295 A1* | 6/2009 | Hatch | G06Q 20/3552 705/71 |
| 2009/0319784 A1* | 12/2009 | Faith | G06Q 20/322 713/158 |
| 2010/0027786 A1* | 2/2010 | Faith | G06F 21/606 380/44 |
| 2010/0127083 A1 | 5/2010 | Brown et al. | |
| 2010/0185545 A1* | 7/2010 | Royyuru | G06Q 20/04 705/67 |
| 2010/0258625 A1* | 10/2010 | Stanfield | G06Q 20/24 235/380 |
| 2011/0184867 A1 | 7/2011 | Varadarajan | |
| 2011/0246369 A1* | 10/2011 | de Oliveira | G06Q 20/40 705/64 |
| 2011/0258452 A1* | 10/2011 | Coulier | H04L 9/3271 713/171 |
| 2012/0066504 A1* | 3/2012 | Hird | G06F 21/31 713/183 |
| 2012/0078735 A1* | 3/2012 | Bauer | G06Q 20/20 705/16 |
| 2012/0153028 A1* | 6/2012 | Poznansky | G07F 7/122 235/492 |
| 2014/0067675 A1* | 3/2014 | Leyva | G06Q 20/40 705/44 |
| 2014/0067683 A1* | 3/2014 | Varadarajan | G06Q 20/04 705/44 |
| 2014/0344153 A1* | 11/2014 | Raj | G06Q 20/3223 705/44 |
| 2014/0358777 A1* | 12/2014 | Gueh | G06Q 20/1085 705/43 |
| 2015/0071441 A1* | 3/2015 | Hinz | H04L 9/0869 380/270 |
| 2015/0319151 A1* | 11/2015 | Chastain | H04L 9/083 713/171 |
| 2016/0086171 A1* | 3/2016 | Rehe | G06Q 20/385 705/44 |
| 2016/0246969 A1* | 8/2016 | Talamo | G06F 21/602 |
| 2016/0335531 A1* | 11/2016 | Mullen | G06Q 20/357 |
| 2017/0061403 A1* | 3/2017 | Reisgies | G06Q 20/3823 |

OTHER PUBLICATIONS

"Michael O. Rabin, Digitalized Signatures and Public-Key functions as Intractable as Factorization, Jan. 1979, Massachusetts Institute of Technology Laboratory for Computer Science, 1979" (Year: 1979).*

"Steven Galbraith, Chapter 24 The RSA and Rabin Cryptosystems, 2012, Mathematics of Public Key Cryptography, 2012" (Year: 2012).*

Preliminary Search Report with regard to FR 1560772 dated Mar. 9, 2016.

European Office Action dated Aug. 8, 2019 for corresponding European Application No. 16197843.2.

Machine translation of the European Office Action dated Aug. 4, 2019 for corresponding European Application No. 16197843.2.

"Hash chain", Wikipedia definition, Retrieved from https://en.wikipedia.org/w/index.php?title=Hash_chain&olded=686647649, XP55768567A, Downloaded on Jan. 25, 2021.

Machine translation of Search Report dated Jan. 28, 2021 from corresponding parallel French Application No. 16197843.2.

French Search Report and Written Opinion dated Mar. 9, 2016 for French Application No. 1560772, filed Nov. 10, 2015.

English translation of the French Written Opinion dated Mar. 9, 2016 for French Application No. 1560772, filed Nov. 10, 2015.

* cited by examiner

METHOD FOR THE ENCRYPTION OF PAYMENT MEANS DATA, CORRESPONDING PAYMENT MEANS, SERVER AND PROGRAMS

1. CROSS-REFERENCE

The present application claims priority to French Patent Application No. 1560772, filed Nov. 10, 2015, the entirety of which is incorporated herein by reference.

2. FIELD OF THE TECHNOLOGY

The invention relates to the securing of payment means. The invention relates more specifically to the securing of payment means comprising personal data. The invention relates more particularly to the securing of bank cards.

To make purchases on the Internet, users have become habituated to entering data about their bank cards into entry forms. Some of this data is meant to limit fraud. This data includes especially the visual three-digit cryptogram on the back of the card. However, it happens that 80% of fraudulent transactions carried out remotely are made with this code.

3. BACKGROUND

To overcome the major fraud to which this particular means of payment is subjected during online payments, solutions have been proposed such as the technique known as the "3D Secure" technique.

This technique is used to add an additional verification step during the payment on the Internet. "3D Secure" was developed by Visa© and Mastercard© to enable merchants to limit the risks of Internet fraud related to attempts at identity theft. This step makes sure, during each online payment, that the card is being used by its true holder. Thus, an additional step of entry takes place when the payment is made. In addition to the bank number, the expiry date of the card and the three digits of the security code (printed on the back of the card), the web user must enter a password, such as his date of birth (simple authentication) or a dynamic one-time use code (strong authentication) that he receives by SMS. This latter solution is more efficient because it makes sure that the user entering the data on the bank card also has a communications terminal enabling him to receive a code that is dynamically generated. In other words "3D Secure" uses the phone number of the card holder in order to transmit a "challenge" to this holder proving the identity of the user trying to make payment by bank card (the challenge being a code to be entered into a determined field of a web page). Thus, the proposed technique consists of the transmission of data representing information coming from merchants (security messages, business messages, information messages), indirectly to the users by using a data transmission service proper to the server of a banking institution with which said user possess a bank account. The 3D Secure technique however has limitations: the first limitation is that the bank and the online merchant must first of all be equipped with complementary architecture. This is not always the case. The second limitation is that the need to perform this additional information entry step is a considerable cause of abandonment of orders by users. Indeed, the fact of being obliged to have one's communications terminal ready at hand in order to read the dynamic code in it is an inconvenience.

In order to overcome this problem of loss of customers and complexity of architecture, industrialists have proposed a payment card comprising a dynamic code, the value of which evolves over a determined time period (for example every hour or every half hour). This is a classic-format bank card complying with prevailing standards (especially in terms of size and thickness). On the back of this card, at the traditional position of the verification code (CVV), this card embeds an "E ink" (electrophoretic ink) type of screen comprising three characters. This screen is connected by a data bus to a processor which is connected to a battery that is small and thin enough to be inserted into the payment card without changing the card format. The processor is responsible for regularly modifying the verification code.

The following technique is implemented to modify the verification code: on the basis of an original code, the computer, at regular intervals, computes a new code directly derived from this original code. This computation is done by carrying out a cryptographic operation on the original code, this operation delivering a dynamic code which is for example displayed on the "E ink" screen. For its part, the server also receives the original code associated with the user's card. When the user makes a payment, the server receives the dynamic code which has been entered by the user. On the basis of this received dynamic code, the server carries out a computation in reverse to the computation made by the processor of the card to retrieve the original code (and therefore compares the code obtained with the reference code that it possesses itself); as an alternative, on the basis of the received dynamic code, the server carries out a computation identical to the computation made by the processor of the card, from the reference code, and verifies that the same verification code as the one already received is obtained. In a third variant, the processor of the card computes a digital signature, the validity of which is then verified by the server.

It will be understood that, whatever the method employed, it implements firstly a cryptographic device, possessed by the card and the server and, secondly, a time-related component: indeed, to be able to generate a code dynamically, for example every hour or every half hour, the processor of the bank card has a clock, on the basis of which the cryptographic computation is made. As an alternative, the user himself can request a new code by pressing a button.

This application leads to a recurrent problem, namely the desynchronization of the clocks of the card and of the server. This problem appears, for example, in the following scenario: the user's card generates a dynamic code (on the basis of the counters, the date and the time, etc.) which it transmits to the user (for example using a screen). This code is transmitted to the card issuing party which must verify its validity. For this purpose, the card issuing party must itself, using the same algorithms as the card, generate a code under the conditions (time, etc.) of the transaction. If the code transmitted by the user and the code recomputed by the issuing party coincide, then the transaction is validated. This approach requires synchronization between the card and the issuer of the card.

This synchronization is done at the time of creation of the card by the manufacturer and can occasionally be done again (by an automatic bank teller for example) but these updates are only episodic.

The card can also, very frequently, get desynchronized in the presence of an electromagnetic field of greater or lesser intensity. Such electromagnetic fields, which can disturb the clock of the card, are usually encountered in the presence of Wifi, Bluetooth, GSM, 3G, 4G, but also with security systems (for example safety doors in supermarkets or physical shops) and/or even contactless data reading devices that may be defective or wrongly calibrated.

The result of this is a wrong clock value on the card side which substantially disturbs the mechanism for creating the dynamic code. Similarly, on the server side, there can be other disturbances.

Thus, the code generated by the server can be different from the code generated by the card and the transactions then will no longer be accepted unless there is an updating and/or resynchronization procedure (resynchronization with the correct time can be done only at an automatic bank teller) since the payment terminals are not entitled to write on the card and are not necessarily connected to the bank at the time of the transaction.

There is therefore a need to provide a technique for generating a code that is not sensitive or is insensitive to desynchronization and therefore to disturbances undergone through the external environment.

4. SUMMARY

The proposed technique does not have the drawbacks of the prior art. The proposed technique makes it possible to reduce or even remove the problems caused by the desynchronization of the payment means and of the server. Indeed, the proposed technique is based on the implementation of a particular chaining of payment data generation. This chaining furthermore offers audibility of the generated codes.

Thus, the present technique relates to a method for encrypting a piece of payment means data, this method being implemented by a payment means comprising a data processor. Such a method comprises at least one iteration of the following steps:
  obtaining a current piece of payment means data from a memory of the payment means;
  generating a following piece of payment means data as a function of the current piece of payment means data and as a function of an encryption key of the payment means;
  replacing the current piece of payment means data by the following piece of payment means data within the memory of the payment means.

According to one particular characteristic, said step for generating comprises the implementing of an encryption function such that the following piece of payment means data depends on the encryption function, said encryption function comprising the obtaining of:
  the square of the current piece of payment means data;
  this square modulo the encryption key.

According to one particular embodiment, said piece of payment means data is a verification code.

According to one particular characteristic, said method furthermore comprises a step for displaying said following piece of payment means data on a screen of said payment means.

According to one particular characteristic, said encryption method furthermore comprises a step for transmitting said following piece of payment means data to a payment terminal.

The technique also relates to a payment means comprising a data payment processor, said payment means being characterized in that they comprise encryption means that can be actuated iteratively. The encryption means of the payment means comprise:
  means for obtaining a current piece of payment means data from a secured memory of the payment means;
  means for generating a following piece of payment means data as a function of the current piece of payment means data and as a function of an encryption key of the payment means;
  means for replacing the current piece of payment means data by the following piece of payment means data within the secured memory.

According to another aspect, the technique also relates to a method for verifying the validity of a piece of payment means data, this method being implemented by a processing server comprising a data processor. Such a method comprises:
  a step for obtaining a piece of payment means reference data;
  a step for obtaining at least one piece of payment means comparison data from the piece of payment means reference data as a function of a predetermined time period, delivering a set of reference data;
  a step for obtaining a current piece of payment means data; and
  a step for comparing the current piece of payment means with the data of said set of reference data delivering an assertion of validity of said current piece of payment means data when it is identical to one of the pieces of data of the set.

According to another aspect, the technique also relates to a processing server comprising a data processor, this server comprising means of cryptographic processing capable of enabling a verification of the validity of a piece of payment means data. The cryptographic processing means comprise:
  means for obtaining a piece of payment means reference data;
  means for obtaining at least one piece of payment means comparison data from the piece of payment means reference data as a function of a predetermined time period delivering a set of reference data;
  means for obtaining a current piece of payment means data; and
  means for comparing the current piece of payment means data with the data of said set of reference data, delivering an assertion of validity of said current piece of payment means data when it is identical to one of the pieces of data of the set.

According to a preferred implementation, the different steps of the methods according to the proposed technique are implemented by one or more software programs or computer programs comprising software instructions that are to be executed by a data processor of a relay module according to the proposed technique and are designed to command the execution of the different steps of the methods.

The proposed technique is therefore also aimed at providing a program capable of being executed by a computer or a data processor, this program comprising instructions to command the execution of the steps of a method as mentioned here above.

This program can use any programming language whatsoever and can be in the form of source code, object code or intermediate code between source code and object code, such as in a partially compiled form or in any other desirable form.

The proposed technique is also aimed at providing an information carrier readable by a data processor and comprising instructions of a program as mentioned here above.

The information carrier can be any entity or device whatsoever capable of storing the program. For example, the carrier can comprise a storage means such as a ROM, for example a CD ROM or a microelectronic circuit ROM or again a magnetic recording means, for example a floppy disk or a hard disk drive.

The information carrier can also be a transmissible carrier such as an electrical or optical signal which can be conveyed via an electrical or optical cable, by radio or by other means. The program according to the proposed technique can especially be uploaded to an Internet type network.

As an alternative, the information carrier can be an integrated circuit into which the program is incorporated, the circuit being adapted to execute or to be used in the execution of the method in question.

According to one embodiment, the proposed technique is implemented by means of software and/or hardware components. In this respect, the term "module" can correspond, in this document, equally well to a software component and to a hardware component or to a set of hardware and software components.

A software component corresponds to one or more computer programs, one or more sub-programs of a program or more generally to any element of a program or a piece of software capable of implementing a function or a set of functions as described here above for the module concerned. Such a software component is executed by a data processor of a physical entity (terminal, server, gateway, router, etc.) and is capable of accessing the hardware resources of this physical entity (memories, recording media, communications buses, electronic input/output boards, user interfaces, etc.).

In the same way, a hardware component corresponds to any element of a hardware unit capable of implementing a function or a set of functions as described here above for the module concerned. It can be a programmable hardware component or a component with an integrated processor for the execution of software, for example an integrated circuit, a smartcard, a memory card, an electronic board for the execution of firmware, etc.

Each component of the previously described system naturally implements its own software modules.

The different embodiments mentioned here above can be combined with each other to implement the proposed technique.

5. BRIEF DESCRIPTION OF THE FIGURES

Other features and advantages of the proposed technique shall appear more clearly from the following description of a preferred embodiment, given by way of a simple illustratory and non-exhaustive example and from the appended drawings, of which

6. DESCRIPTION

6.1. Reminder of the Principle

The general principle of the present technique consists of an implementation of a chaining process for the computation of the different payment means data. Such a chaining process has many advantages, including that of enabling an audit of the codes created (i.e. it is always possible, with the method described, to verify whether a given code is authentic or not). Another advantage as described below is that the invention proposes a method for creating a code that is simple and has low resource intensiveness or "low resource hunger".

The technique described has two different aspects: firstly, a code for generating a code from an initial code, this technique being implemented within the payment means; secondly, a code verification technique (for purposes of validation of payment transaction and/or audit purposes), this verification technique being implemented within a processing server (such a server can be a financial processing server, such as for example a bank server).

Thus, the present technique is also aimed on the one hand at providing a payment means (such as for example a bank card) comprising a means of code generation from an initial code. The present technique is also aimed at providing a server, of a processing server type, for processing bank transaction data, comprising code verification means.

Figure 1:
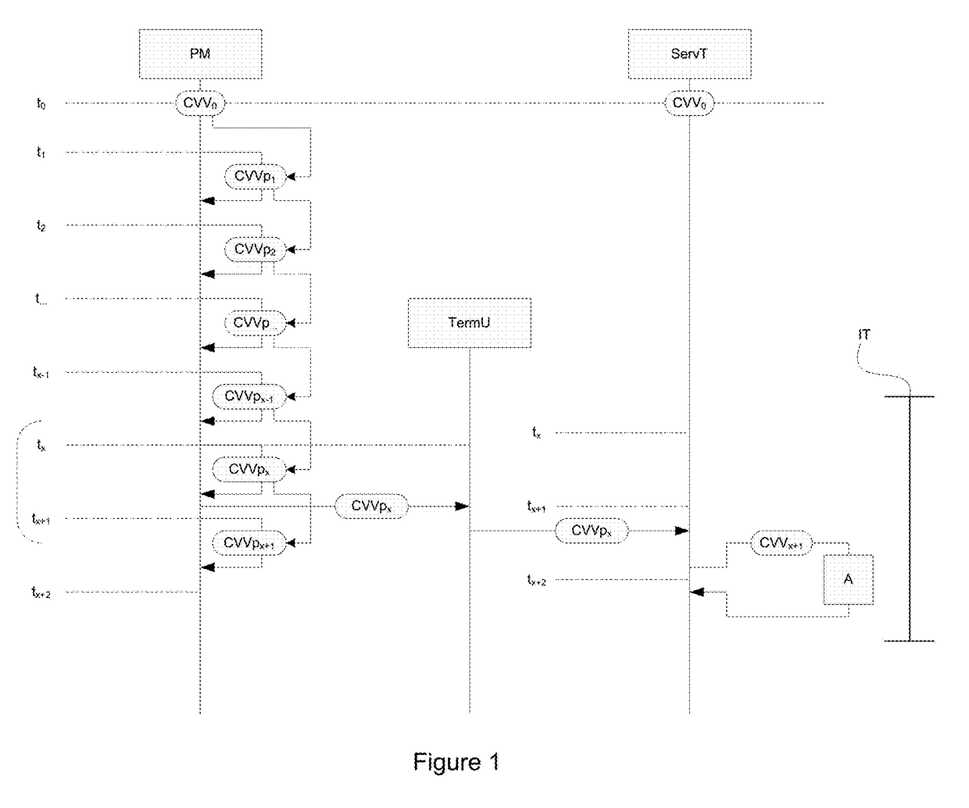
FIG. 1 is a sequence diagram of the general method according to the proposed technique.

The general principle of the proposed technique is described with reference to FIG. 1. In this description of the general principle, the code used is a verification code (CVV or card verification value). It is understood that the technique described can also be used for other data, provided that this data is part of the payment data of a payment means.

A payment means (PM) and a server (ServT) each possess an identical code (CVV0). This code is provided to the payment means when this payment means is initialized by the entity (for example the bank establishment) which manages the processing server. At the time of this initialization (t0), the server ServT and the payment means PM are synchronized. The payment means regularly generate ($t_1$, $t_2$, ... $t_{x-1}$, $t_x$) codes ($CVVp_1$, $CVVp_2$, $CVVp$ ..., $CVVp_{x-1}$, $Cvvpx$). Each generated code depends on the previously generated code. Thus, the code $CVVp_2$ depends on the code $CVVp_1$, ... the code $Cvvp_x$ depend on the code $Cvvp_{x-1}$. For its part, the processing server can perform a similar operation (although this is not obligatory, as described further below).

Between the instant $t_x$ and the instant $t_{x+1}$, the code $CVVp_x$ is used on the user's terminal TermU in order to carry out a payment transaction. The code $CVVp_x$ is therefore transmitted to the server ServT which, given the desynchronization between the payment means, receives the code at the time $t_{x+1}$. In the prior-art technique, this code would have been considered to be invalid. This is not the case for the present technique.

Indeed, upon reception of this code, the processing server (ServT) determines a processing slot (IT). From the code in its possession (for example the current code $CVV_{x+1}$) and this processing interval, it determines, within a processing operation [A], at least one eligible code (at least one code which is likely to correspond to the code given by the user). Depending on the computations made and the value transmitted, it then delivers either an assertion of validity of the verification code received or an assertion of non-validity of the verification code received.

To carry out the chaining between the different code values and so that this chaining is efficient in terms of security (i.e. so that it is not possible to deduce a preceding value from a known value), an encryption is made. This encryption is based on a public key (public elements being denoted "n" herein) possessed by the payment means and a private key (private elements being denoted "(p, q)" herein) possessed by the server. It should also be noted that the server can also have available the public key of the card (it is assumed that the server is secured and that possession of this key is not detrimental to the securing scheme).

Figure 2:
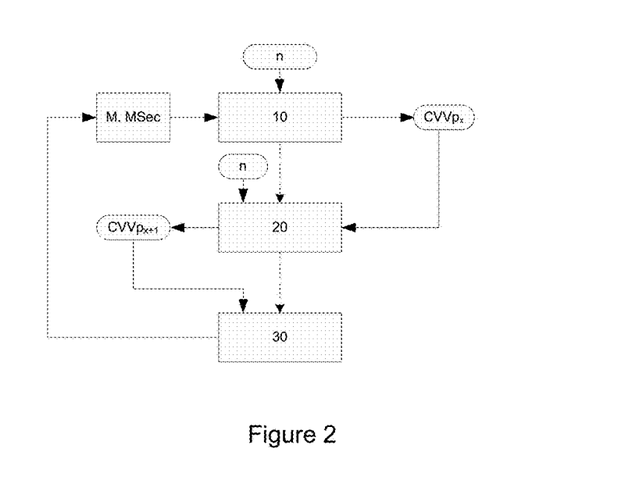
FIG. 2 is a simplified depiction of the technique implemented by a payment means.

The method implemented by the payment means is described with reference to FIG. 2. This is a method for encrypting a piece of payment means data (CVVp), this method being implemented by a payment means (PM) comprising a data-processing server (UC), the method being characterized in that it comprises at least one iteration of the following steps:
- obtaining (10) a current piece of payment means data ($CVVp_x$) from a memory (M, Msec) of the payment means;
- generating (20) a following piece of payment means data ($CVVp_{x+1}$), as a function of the current piece of payment means data (CVVp) and as a function of an encryption key of the payment means (n);
- replacing (30) the current piece of payment means data (CVVp) by the following piece of payment means data ($CVVp_{x+1}$) within the memory (M, Msec) of the payment means.

Thus, the method implemented within the payment means defines a piece of payment means data iteratively, as a function of predefined time period. This definition includes the generation of the code on the basis of an encryption key and only the corresponding encryption key makes it possible to be sure of the validity of a received piece of data.

The generation of the following piece of payment means data relative to the current piece of payment means data comprises for example, when the size of the current data and the size of the encryption key do not correspond with each other (i.e. the size of the current data is smaller than the size of the key):
- a step for filling an intermediate value to be encoded as a function of a part of a size of the current data and the size of the encryption key: for example, for a current piece of data equal to 457, the intermediate value will be filled with a value of a size that attains the size of the key minus three (the size of the value 457 being equal to three);
- a step of encryption of the intermediate value by means of the encryption key (n), delivering an encrypted intermediate value; and
- a step of selection, within the encrypted intermediate key, of a portion of an encrypted intermediate value, the size of which is equal to the size of the current value, delivering the following piece of payment means data.

Thus, through this method, firstly a robust method of data generation is available (it is possible, for example to have available large key sizes) and the possibility of generating encrypted data that are compliant with the size expected for this data is preserved.

Naturally, the above explanations relate to the use of a verification code as a piece of dynamic data. It is also possible, according to other embodiments, to apply dynamic generation to other data, although this could raise problems of interoperability. Similarly, an interaction has been described involving a payment means comprising a means of dynamic generation of data. Such a payment means can, as explained above, be a bank card having available an "E-ink" screen displaying a dynamic CVV code. As an alternative, such a payment means can also take the form of a communications terminal embedding bank card data, a (secured) processor of this terminal being capable of producing a verification code of this kind dynamically.

6.2. Server Side Processing

The server which receives a piece of data coming from a customer terminal must be capable of ascertaining that this piece of data is accurate, i.e. that it corresponds to an expected piece of data. If we return to the previous example, it is assumed that originally, the server has the same code available as the payment means (i.e. the same CVV). When the server receives a code coming from a terminal, it does not necessarily know when this code has been transmitted: indeed, random factors of transmission can come into play, in addition to or instead of a possible desychronization.

It is possible that there may be greater or smaller differences between the code received by the server and the code presently in the possession of the server (i.e. the code that is valid according to the server). This means that, on the basis of the predetermined processing slot (IT), the server re-computes a certain number of codes valid at different times. These codes must enable checking firstly of whether the received code corresponds to an authentic code (i.e. a code obtained by means of the public key of the payment means) and secondly whether the received code corresponds to an acceptable code with regard to the predetermined processing time slot.

Figure 3:
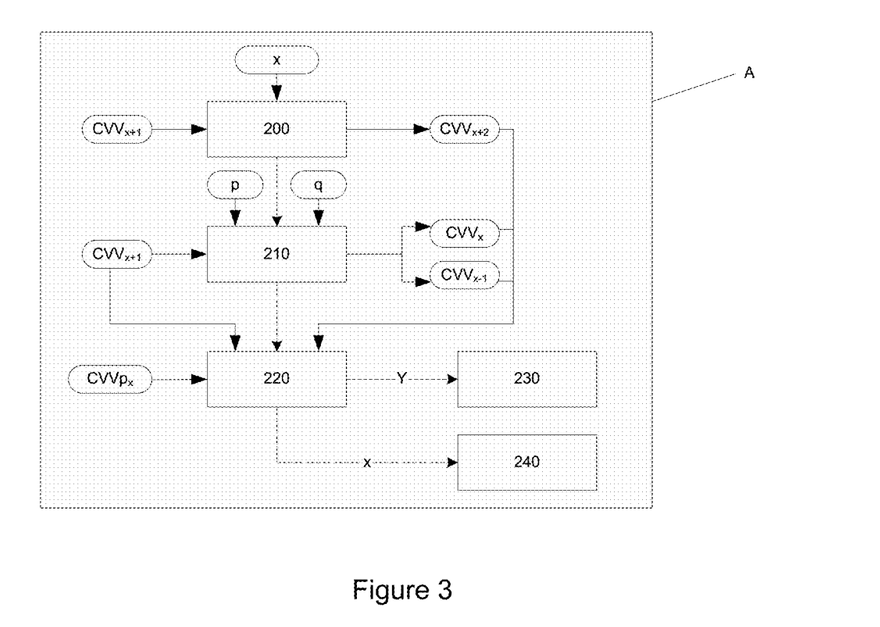
FIG. 3 is a simplified depiction of the technique implemented by a processing server.

The processing implemented on the server side is described, in one embodiment, with reference to FIG. 3. More particularly, this is a description of the processing [A] referenced in FIG. 1.

The server obtains the current code ($CVV_{x+1}$), i.e. the code that corresponds to its own temporal configuration. On the basis of this current code ($CVV_{x+1}$) and using the public key of the card (n), the server computes (200), a predetermined number of following codes ($CVV_{x+2}$). The predetermined number of following codes depends on the predetermined processing slot.

From this current code ($CVV_{x+1}$) and using the private key of the card (p, q), the server computes (210) a predetermined number of preceding codes ($CVV_x$, $CVV_{x-1}$). The predetermined number of preceding codes depends on the predetermined processing slot.

The set of codes (previous codes, current code, following codes) is compared (220) with the code received from the card ($CVVp_x$). If the received code ($CVVp_x$) corresponds to a code of the set of codes (Y), then an assertion of validation is sent out (230). If the received code ($CVVp_x$) does not correspond to a code of the set of codes (Y), then an assertion of non-validation is sent out (240).

The non-correspondence of the received code with the computed code can arise out of (at least) two different situations: the first corresponds to a wrong code, which occurs for example when a malicious individual tries to carry out a transaction without having a code that is accurately computed or when the legitimate bearer has entered this code erroneously; this latter situation corresponds to a code which, although correct from the viewpoint of the computations made, has reached the server too late or too early: the code received by the server is outside the predetermined processing time slot.

According to one variant that is not shown, the current code is determined, by the processing server, at the time of reception of the code coming from the user's terminal. The operation for obtaining the current code (and therefore the set of codes) is thus performed somewhat differently. To this end, the processing server uses the time of the transaction, which it receives (or determines) at the time of reception of data coming from the user's terminal. The time of the transaction makes it possible to determine a theoretical number of iterations to be applied to the basic code (CVV0) to obtain the theoretical current code. Depending on the predetermined processing slot (IT), a certain number of preceding and following codes as well as the theoretical current code are also obtained. They then all constitute the set of codes (previous codes, current code, following code) to be compared.

6.3. Description of One Particular Embodiment

In the present embodiment, a more precise description is provided of the method presented above on the basis of a combination of two particular encryption/signing techniques applied to the generation of verification codes on a bank card having available means of dynamic verification of codes It is thus possible to generate CVV verification codes in such a way that a reasonable difference (where the term "reasonable" is determined by the party issuing the card and takes the form of a predetermined processing slot (IT)) between two clock signals has no impact on the code generation function and enable the managing entity (for example the banking institution) to restore the synchronization. Auditability lies in the assurance that it is possible to verify the validity of all the codes transmitted on all the transactions made by the user.

In this embodiment, the technique relies on two cryptographic components: the Rabin encryption and the notion of the hash chain/block chain).

6.3.1. Rabin Cryptosystem

The Rabin cryptosystem is an asymmetric encryption protocol that ensures the confidentiality of data by means of a public key/private key pair. Its security relies on the difficulty of factorizing large integers i.e. given a large integer number n, finding the integers p and q such that n=pq when p and q are large prime numbers.

In the present invention, the issuing party of the card (the management entity, i.e. for example the banking institution), has a secret integer p and a secret integer q of sufficient size (1024 bits at least). The issuing party records the public key n=p within a memory of the card.

In order to encrypt a message, represented by an integer m ranging from 0 to n−1, the encrypted message c is computed by the formula $c=m^2 \bmod n$.

For example, to encrypt the verification code $CVV_x$ with a value 123, first of all the keys to be used will be defined. In a simple example, we take n=1007 and p=53 and q=19. During the encryption, the following computation is performed: $123^2 \bmod 1007 = 24$.

It is also possible to consider a realistic case where n is a true RSA module with 1024 bits and instead of directly encrypting 123, we encrypt mu(123) where mu is an RSA padding function that has the property of being an OAEP (Optimal Asymmetric Encryption Padding)

A real-sized example would be for example:
p=12131072439211271897323671531612440428472427633701410925634549312301964373042085619324197365322416866541017057361365214171711713797974299334871062829803541;
q=12027524255478748885956220793734512128733387803682075433653899983955179850988797899869146900809131611534468170508320960221601463663463918124709871054152335;
n=1459067680075833232301869393490706352924018723753571643995818710198734387990053589383695714026701498021218180862924674228281570229220767469065434012248896724724079269699871005812901031993178587536637108623576565105078837142971156373427889114635351027120327651665184117268598379886721118372050855263466187400533;
m=5550413937013224749740424186550180736672447052922500708096113659365464572723688235241126555545699165872242276335776223538256837164038753658043904410978231386843374197602621960023862407630671164277582553052859590534480734979369662736439698341437851846711473979473756400753049463122684609316625649987101531205;
C=72887787831023330587937844447155554116242457460642149293987706438343822009586727171789941078352692679176703124224730132072434243050619897305777436514816095711718263527989545192373335352660403037000511781619097566189180061353780475984186668336484444587742195501262476807847210491098614841292100452980810558633;

Only the entity having the private key (p, q) can encrypt this message (i.e. the card issuer, for example the banking institution). To this end, it computes the square root of c modulo n, using its knowledge of the Euler function φ(n)= (p−1)(q−1).

6.3.2. Hash Chain

A hash chain is a sequence of numbers $M_1, M_2, \ldots, M_k$ that meets the property $M_{i+1} = f(M_i)$ for a function $f$ called a hash function. Classic hash functions are MD4, MD5, SHA (1, 2 or 3), and can be obtained from any block encryption mechanism (for example the AES encryption mechanism) in an appropriate mode.

The interest in a hash chain is especially that it is easy by computation to obtain the terms that follow a given term but difficult by computation to obtain the terms that precede a given term (i.e. secret piece of data that is known).

In the context of the present technique, the hash function used is the Rabin function $f(x)=x^2 \bmod n$ described above. The value of the Rabin function is that its security is mathematically demonstrated and relies on the difficulty of factoring large integers. Besides, the computation of the modular square of a number is particularly well suited to the implementation for a verification code.

Besides, in the case of the Rabin function, it is in fact possible to trace back along the chain, provided that a secret is possessed, namely the decomposition of the number n into prime factors. It is possible to use any hash function to fulfill the same functionality (for example RSA).

6.3.3. Generation of CVV

At the time of its use, the card will generate a new CVV. This point in time can be determined by several events: user input, regular triggering based on a clock signal, a command received by a terminal etc.

A new CVV $C_{i+1}$ is generated by the card from the last CVV used $C_i$, in using the Rabin function: $C_{i+1} = f(C_i)$. It can then be communicated to the user by a variety of means (display, etc.) or directly transmitted (terminal, etc.) to the person who will verify its validity.

Figure 6:
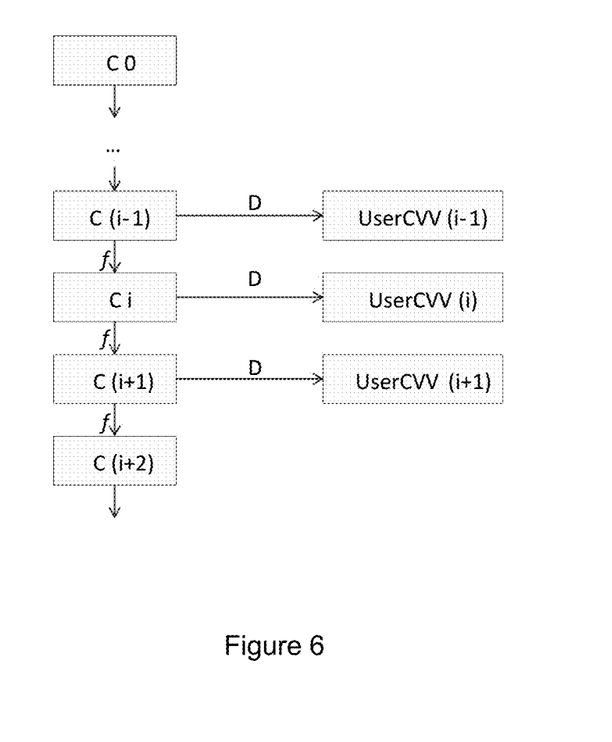
FIG. 6 briefly describes the implementation of the technique with computation of a reduced value of a piece of payment means data.

Naturally, in a real case, as shown in FIG. 6, it is not the totality of the result of the function $f$ that is displayed (the length of 1024 bits would be far too great). Thus, it is possible to display only one function $D(C_{i+1})$ which depends for example on the 8, 16, 24 or 32 last bits of $C_{i+1}$. As an alternative, D can be a hash function. Thus, a reasonably short size is kept for the user input (3 to 5 characters for example, with about 10 characters at most so that this piece of data can be entered in a simple manner by the user).

The verification can then be modified accordingly to take account only of the portion in question of $D(C_{i+1})$ communicated to the user. Naturally, this method for reducing the length of the code value can be implemented whatever the payment means data and is in no way limited to the verification code (CVV).

Once the new CVV is used, it is memorized by the card. It will be used to generate a subsequent CVV.

When the card is manufactured, it is provided with a first CVV, $C_0$ known to the issuing party, which will serve as a seed (i.e. the initial value) to generate all the following CVVs.

6.3.4. Verification of CVV and Resynchronization

The processing server, in charge of verifying a received code has the last validated CVV $C_m$ used by the card available in its memory. When the card transmits a new CVV $C_{i+1}$, the processing server performs the following operations:

If $C_{i+1}=f(C_m)$, then the CVV is valid, the transmission is accepted and the new value of $C_m$ becomes $C_{i+1}$ Else:

For j between 2 and a given value $j_{max}$ (for example 4) the verifier computes $C_{m+j}$;

If $C_{i+1}=C_{m+j}$ for a value of j then there has been desynchronization but the transaction is valid: the transaction is accepted, and the new value of $C_m$ becomes $C_{i+1}$;

Else, the transaction is rejected.

It can be pointed out that, when the function D defined above is used, it is actually $D(C_{j+1})$ and $D(f(C_m))$ that are compared, all things being equal.

The value of $j_{max}$ is the maximum difference accepted by the processing server and represents the processing slot IT. This value can be fixed in advance or it can be adapted: for example, it is possible to accept a major difference only once and thereafter require that the differences be smaller.

In general, the events of resynchronization can be recorded by the verifier, for purposes of analysis, fraud detection or maintenance. The operation is transparent to the card holder.

6.3.5. Auditability

The set of CVVs generated by a card can be verified in two ways (1) directly, from the seed (i.e. the initial value) by recomputing all the CVVs iteratively until the current point (slow rewind point) or (2) in using the breakdown of the secret number n to directly compute a modular root (fast rewind) and reach any CVV whatsoever. These methods are presented with reference to FIG. 7, which presents firstly (A), the sequencing of the computations that must be performed by the card (in this example the value $C_{k+1}$ is already possessed by the server because the server has already verified this value in the light of the past, and the server must verify the value $C_i$). To this end, two methods can be envisaged (M1 and M2).

Figure 7:
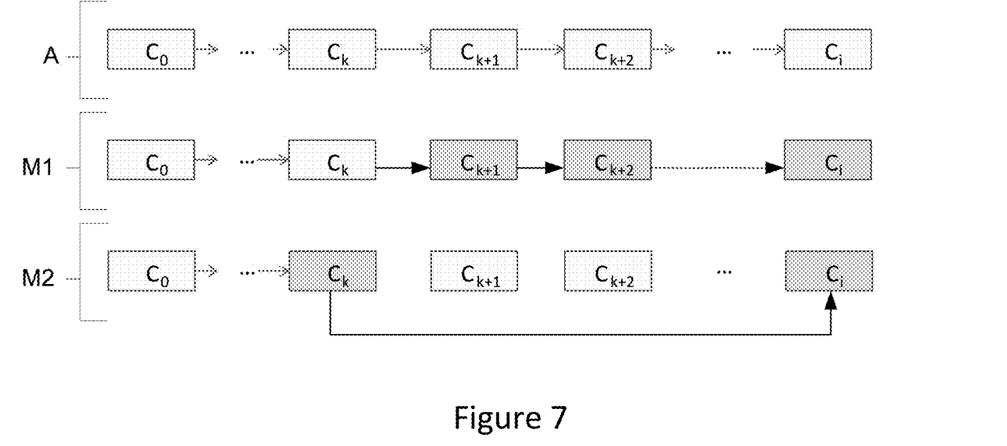
FIG. 7 briefly describes two methods for auditing the value of codes of a piece of payment means data.

The first method can be achieved by any entity possessing the public key n but is also relatively costly. This limits the method to the checking of a few successive transactions. This is the method M1 in which the server, working from the last value in its possession ($C_{k+1}$), iteratively computes all the intermediate codes CVV until it obtains the sought value ($C_i$). The advantage of this method is that all the successive intermediate values of the code are verified at the same time.

The second method M2, reserved for an entity that possesses the secret key (for example the server) enables immediate verification of the entire code chain (CVV) in an arbitrary order: using keys, the server can carry out direct computations of the desired occurrence from the initial value of the code. This method of direct computation is not the object of the present invention and is therefore not described in greater detail.

5.4. Other Characteristics and Advantages

Figure 4:
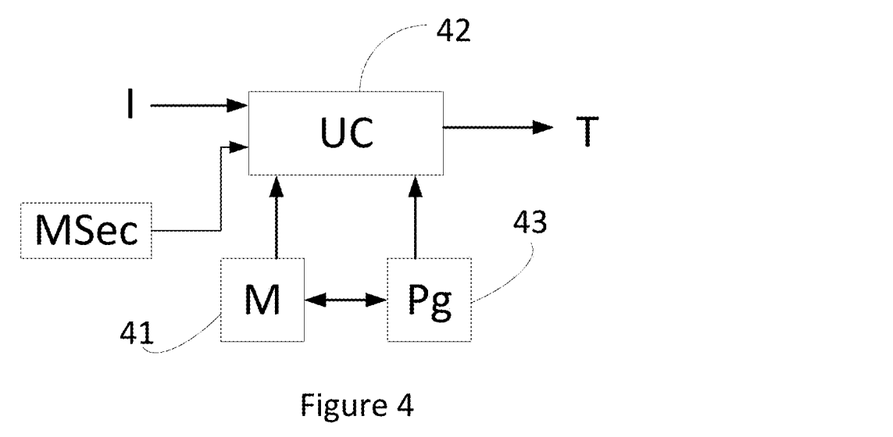
FIG. 4 briefly describes the hardware architecture of a payment means adapted to implementing the present techniques.

Referring to FIG. 4, we present a description of a communications terminal comprising means for the execution of the method described above in order to provide a dynamic management of bank data.

For example, the communications terminal comprises a memory 41 constituted by a buffer memory, a processing unit 42, equipped for example with a microprocessor and driven by a computer program 43, implementing the required steps for obtaining, computing and transmitting bank processing data (verification codes, validity dates, etc.).

At initialization, the code instructions of the computer program 43 are for example loaded into a memory and then executed by the processor of the processing unit 42. The processing unit 42 inputs for example a current piece of bank data (for example a current verification code). The microprocessor of the processing unit 42 implements the steps of the method according to the instructions of the computer program 43 to enable the computation of a following piece of bank data (for example a following verification code).

To this end, the processing device comprises, in addition to the buffer memory 41, means of computation and encryption, comprising especially a processor, for example a secured processor and an equally secured memory. These means can be driven by the processor of the processing unit 42 as a function of the computer program 43.

Figure 5:
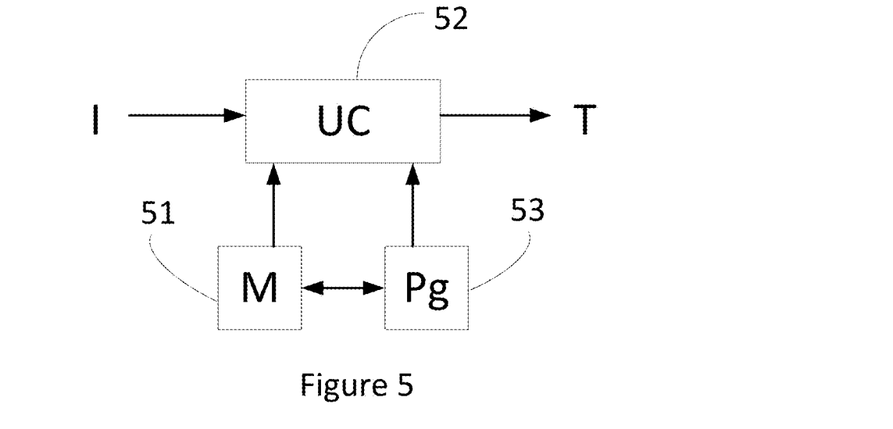
FIG. 5 briefly describes the hardware architecture of a processing server suited to implementing the present technique.

Referring to FIG. 5, we present a processing server comprising means to execute the method described above.

For example, the processing server comprises a memory 51 constituted by a buffer memory, a processing unit 52 equipped for example with a microprocessor, and driven by the computer program 53, needed to implement functions for verifying transaction data and especially received bank data.

At initialization, the code instructions of the computer program 53 are for example loaded into a memory and then executed by the processor of the processing unit 52. The processing unit 52 inputs for example a set of encrypted data comprising, for example, a current piece of bank data. The microprocessor of the processing unit 52 implements the steps of the processing method according to the instructions of the computer program 53 to enable the verification of the current piece of bank data relative to piece of reference bank data, computed in relation to a predetermined time slot.

To this end, the device comprises, in addition to the buffer memory 51, means for obtaining the encryption/decryption key, these means taking possibly the form of a processor or a set of secured resources securing the authorization input. The device also comprises means of cryptographic processing, these processing means comprising for example a dedicated encryption processor.

These means can be driven by the processor of the processing unit 52 as a function of the computer program 53.

What is claimed is:

1. A method for verifying the validity of a piece of payment means data for implementing a payment transaction between a payment means comprising a data processor and a processing server comprising a data processor, wherein the method comprises:
 a phase for encrypting the piece of payment means data, implemented by the payment means, comprising:
  obtaining a current piece of payment means data from a memory of the payment means;
  generating a following piece of payment means data as a function of the current piece of payment means data and as a function of a public encryption key n of the payment means, the generating relying on the use of a Rabin asymmetric encryption protocol, said public encryption key n being the product of two large prime integers p and q;
  transmitting the following piece of payment means data to the processing server; and
  replacing the current piece of payment means data by the following piece of payment means data within the memory of the payment means, the following piece of payment means data becoming the current piece of payment means data for a subsequent iteration of the obtaining, generating, transmitting and replacing; a phase for verifying the validity of the following piece of payment means data, implemented by the processing server, comprising:
  obtaining the following piece of payment means data from the payment means;
  obtaining a piece of payment means reference data from a memory of the processing server;
  computing, using the Rabin asymmetric encryption protocol, from the piece of payment means reference data, as a function of a predetermined time period:
   a predetermined number of following codes, using the public encryption key n of the payment means; and
   a predetermined number of the preceding codes, using the large prime integers p and q defining a private key of the payment means;
  delivering payment means comparison data, forming a set of reference data; and
  comparing the following piece of payment means data with the data of the set of reference data, delivering an assertion of validity of the following piece of payment means data when the following piece of payment means data is identical to one of the pieces of data of the set of reference data.

2. The method according to claim 1, wherein generating a following piece of payment means data comprises the implementing of an encryption function such that the following piece of payment means data depends on the encryption function, said encryption function comprising the obtaining of:
 the square of the current piece of payment means data; and
 the square modulo the encryption key.

3. The method according to claim 1, wherein said encryption function is a verification code.

4. The method according to claim 1, wherein the method further comprises displaying said following piece of payment means data on a screen of said payment means.

5. The method according to claim 1, wherein the method further comprises transmitting said following piece of payment means data to a payment terminal.

6. A non-transitory computer readable memory comprising a computer program stored thereon, including program code instructions for implementing a phase for encrypting a piece of payment means data of a method for verifying the validity of the piece of payment means data for implementing a payment transaction between a payment means and a processing server, when the program is executed by a processor of the payment means, wherein the program code instructions are configured to:
 obtain a current piece of payment means data from a secure memory of the payment means;
 generate a following piece of payment means data as a function of the current piece of payment means data and as a function of a public encryption key n of the payment means, said generating relying on the use of a Rabin asymmetric encryption protocol, said public encryption key n being the product of two large prime integers p and q;
 transmit the following piece of payment means data to a processing server; and
 replace the current piece of payment means data by the following piece of payment means data within the memory of the payment means, the following piece of payment means data becoming the current piece of payment means data for a subsequent iteration of the obtaining, generating, transmitting and replacing.

7. A non-transitory computer readable memory comprising a computer program stored thereon including program code instructions for implementing a phase for verifying the validity of a piece of payment means data of a method for verifying the validity of the piece of payment means data for implementing a payment transaction between a payment means and a processing server, when the program is executed by a processor of the processing server, wherein the program code instructions are configured to:
 obtain a following piece of payment means data from the payment means;
 obtaining a piece of payment means reference data from a memory of the processing server;
 compute, using a Rabin asymmetric encryption protocol, from the piece of payment means reference data, as a function of a predetermined time period:
  a predetermined number of following codes, using a public encryption key n of the payment means; and
  a predetermined number of the preceding codes, using large prime integers p and q defining a private key of the payment means, n being the product of p and q;
 delivering payment means comparison data, forming a set of reference data;
 compare the following piece of payment means data with the data of the set of reference data, delivering an assertion of validity of the following piece of payment means data when the following piece of payment means data is identical to one of the pieces of data of the set of reference data.

8. A system for verifying the validity of a piece of payment means data for implementing a payment transaction, the system comprising:
 a payment means comprising encryption means that can be actuated iteratively and a data payment processor which is configured to:
  obtain a current piece of payment means data from a secure memory of the payment means;

generate a following piece of payment means data as a function of the current piece of payment means data and as a function of a public encryption key n of the payment means, said generating relying on the use of a Rabin asymmetric encryption protocol, said public encryption key n being the product of two large prime integers p and q;

transmit the following piece of payment means data to a processing server; and replace the current piece of payment means data by the following piece of payment means data within the memory of the payment means, the following piece of payment means data becoming the current piece of payment means data for a subsequent iteration of the obtaining, generating, transmitting and replacing;

a processing server comprising means of cryptographic processing capable of enabling a verification of the validity of a piece of payment means data, and a data processor which is configured to:

obtain the following piece of payment means data from the payment means;

obtaining a piece of payment means reference data from a memory of the processing server;

compute, using the Rabin asymmetric encryption protocol, from the piece of payment means reference data, as a function of a predetermined time period:

a predetermined number of following codes, using the public encryption key n of the payment means; and a predetermined number of the preceding codes, using the large prime integers p and q defining a private key of the payment means;

delivering payment means comparison data, forming a set of reference data;

compare the following piece of payment means data with the data of the set of reference data, delivering an assertion of validity of the following piece of payment means data when the following piece of payment means data is identical to one of the pieces of data of the set of reference data.

\* \* \* \* \*